(12) United States Patent
Jones

(10) Patent No.: US 6,489,594 B2
(45) Date of Patent: Dec. 3, 2002

(54) HEATING APPARATUS FOR PREVENTING ICE DAMS ON A ROOF

(75) Inventor: Thaddeus M. Jones, Bremen, IN (US)

(73) Assignee: MSX, Inc., South Bend, IN (US)

(*) Notice: Subject to any disclaimer, the term of this patent is extended or adjusted under 35 U.S.C. 154(b) by 0 days.

(21) Appl. No.: 09/829,179

(22) Filed: Apr. 9, 2001

(65) Prior Publication Data

US 2001/0025839 A1 Oct. 4, 2001

Related U.S. Application Data

(63) Continuation-in-part of application No. 09/542,493, filed on Apr. 3, 2000, now Pat. No. 6,215,102, which is a continuation-in-part of application No. 09/430,661, filed on Oct. 29, 1999, now Pat. No. 6,184,495.

(51) Int. Cl.[7] ............................................. H05B 1/00
(52) U.S. Cl. ...................... 219/213; 219/528; 219/548; 392/435; 392/436
(58) Field of Search ................... 219/213, 536, 219/537, 526, 525, 528, 535, 548; 392/435, 436, 437, 433; 338/306

(56) References Cited

U.S. PATENT DOCUMENTS

| | | | |
|---|---|---|---|
| 2,111,251 A | 3/1938 | Spilsbury | 219/213 |
| 2,523,353 A | 9/1950 | Boester | 392/435 |
| 3,095,491 A | 6/1963 | Deacon | 219/213 |
| 3,191,004 A | 6/1965 | Hocker | 392/435 |
| 3,277,273 A | 10/1966 | Williams | 392/435 |
| 3,438,069 A | 4/1969 | Long | 219/537 |
| 3,573,430 A | 4/1971 | Eisler | 219/538 |
| 3,691,343 A | 9/1972 | Norman | 219/213 |
| 3,716,076 A | 2/1973 | Franzmeier | 219/213 |
| 3,725,638 A | 4/1973 | Solin et al. | 219/213 |
| 4,134,002 A | 1/1979 | Stanford | 219/213 |
| 4,303,074 A | * 12/1981 | Bender | 219/528 |
| 4,425,497 A | 1/1984 | Leary et al. | 219/536 |
| 4,591,697 A | 5/1986 | Lexer | 392/433 |
| 4,769,526 A | 9/1988 | Taouil | 219/213 |
| 4,994,651 A | 2/1991 | Jones | 219/497 |
| 5,315,090 A | 5/1994 | Lowenthal | 219/213 |
| 5,391,858 A | 2/1995 | Tourangeau et al. | 219/213 |
| 5,550,349 A | 8/1996 | Bomba | 219/213 |
| 5,573,685 A | 11/1996 | Boncaldo | 219/544 |
| 5,611,952 A | 3/1997 | Jones | 219/497 |
| 5,619,613 A | 4/1997 | Otaki | 392/437 |
| 5,710,408 A | 1/1998 | Jones | 219/549 |
| 5,763,858 A | 6/1998 | Jones | 219/213 |
| 5,878,533 A | 3/1999 | Swanfeld, Jr. | 219/213 |
| 5,900,178 A | 5/1999 | Johnsen | 219/213 |
| 5,975,756 A | 11/1999 | Jones | 219/544 |
| 6,057,531 A | 5/2000 | Jones | 219/544 |
| 6,066,164 A | * 5/2000 | Macher et al. | 219/528 |
| 6,084,207 A | 7/2000 | Jones | 219/213 |
| 6,104,352 A | 8/2000 | Jones | 219/213 |
| 6,107,611 A | 8/2000 | Jones | 219/213 |
| 6,140,609 A | 10/2000 | Jones | 219/213 |

* cited by examiner

Primary Examiner—Teresa Walberg
Assistant Examiner—Fadi H. Dahbour
(74) Attorney, Agent, or Firm—Taylor & Aust, P.C.

(57) ABSTRACT

A snow-melting apparatus prevents ice dams on an outside surface of a roof of a building. An outer edge section of the roof extends over and beyond an outside wall of the building in an outward direction. A heat conduction device includes a substantially planar body portion formed of a substantially thermally conductive material and having a first side and a second side. The second side is opposite the first side. The first side has a coating with a high emissivity. The first side transfers heat to an inside surface of at least the outer edge section of the roof. A heat source is attached to the body portion of the heat conduction device.

21 Claims, 8 Drawing Sheets

HEATING APPARATUS FOR PREVENTING ICE DAMS ON A ROOF

CROSS REFERENCE TO RELATED APPLICATION

This is a continuation-in-part of U.S. patent application Ser. No. 09/542,493, entitled "HEATING APPARATUS FOR PREVENTING ICE DAMS ON A ROOF", filed Apr. 3, 2000 now U.S. Pat. No. 6,215,102, which is a continuation-in-part of U.S. patent application Ser. No. 09/430,661, entitled "METHOD AND HEATING APPARATUS FOR PREVENTING ICE DAMS ON A ROOF", filed Oct. 29, 1999, now U.S. Patent No. 6,184,495.

BACKGROUND OF THE INVENTION

1. Field of the Invention

The present invention relates to deicing systems, and, more particularly, to a roof and gutter deicing system.

2. Description of the Related Art

Ice dams forming near the outer edges, or "eaves," of a roof and extending into the gutters are a significant source of damage to a building. Ice dams form when snow on an inner or middle section of a roof melts and the meltwater flows down to the outer section of the roof, where it then refreezes into ice. The heat from within the building conducts through the roof to melt the snow on the middle portion of the roof. However, the outer edge of the roof extends outwardly beyond the outside wall of the building, and therefore is not heated by the heat from within the building. Thus, the melted snow from the middle portion of the roof refreezes and accumulates on the outer edge portion of the roof and in the gutters, thereby forming ice dams. Another possible cause of ice dams is the heating of the dark shingles when exposed to sunlight. Snow on the roof slides down to the gutter, where it abuts the gutter, thaws and refreezes. The freezing of the meltwater eventually builds up into an ice dam.

Such ice dams are known to cause leaks in roofs by allowing water to enter underneath the shingles of the roof and expand upon refreezing, thereby forcing the shingle away from the other shingles on the roof. The weight of ice dams can also tear a gutter away from the roof and/or soffit, thereby requiring costly repairs.

It is known to attach a heater wire to the outside surface of the outer edge portion of the roof. The heater wire may also extend along the gutter and through the downspout in order to maintain an open drainage path for melting of the frozen precipitation.

Snow and ice melting systems commonly employ automatic ON/OFF controls that operate heaters only while required to minimize energy consumption and operating costs. Typically, the automatic ON/OFF controls sense ambient moisture and temperature. However, it is also possible for the automatic ON/OFF control to be in the form of a thermostat which only senses ambient temperature. Heaters operate at ambient temperatures below a threshold—usually 38° F. while ambient moisture is present and for a period of time thereafter to clear accumulated snow and ice. Optionally, the automatic ON/OFF control may inhibit heater operation at temperatures too low for effective melting, e.g., below 17° F. Status indicators and a manual control and test switch are typically included in the same package with such automatic ON/OFF controls.

In order to reduce costs and simplify installation, it is known to install the automatic ON/OFF control package close to the heating device itself. A problem with installing the control package in close proximity to a roof heater is that it is then difficult to observe the status indicators and to test deicing system performance with the manual control and test switch.

Ground current is the difference between the outbound and return heater currents. The U.S. National Electric Code requires using a ground fault circuit interrupter (GFCI) on all snow and ice melting circuits. The GFCI interrupts heater current if the ground current exceeds a predetermined limit; usually 30 milliamperes. The GFCI requires manual reset after tripping. This preserves safety by not restarting heater operation during intermittent ground leakage current that may occur in wet locations.

Independent of the heater fabrication method, ground current can flow due to a heater failure caused by a manufacturing defect, corrosion, wear and tear or mechanical damage. Excessive ground current causes the dual safety problems of fire and shock hazard. An electrical shock hazard can also occur whenever ground current flows since its path to earth ground is usually not predictable. Thus, a GFCI is required to be incorporated into snow and ice melting electrical circuits. It is known to install a residential GFCI in a knockout box adjacent to the deicing system. Again, a problem is that a GFCI disposed next to a roof deicing system is difficult to access for purposes of resetting and/or testing the GFCI.

What is needed in the art is an apparatus for melting snow on the outer edge of a roof that does not require the user to physically access the apparatus in order to periodically reset or test the ground fault circuit interrupter or to monitor the status of the heater.

SUMMARY OF THE INVENTION

The present invention provides a heating apparatus including a ground fault circuit interrupter and a remote receiver for remotely resetting and testing the ground fault circuit interrupter and remotely monitoring the status of the heater.

The invention comprises, in one form thereof, a snow-melting apparatus for preventing ice dams on an outside surface of a roof of a building. An outer edge section of the roof extends over and beyond an outside wall of the building in an outward direction. A heat conduction device includes a substantially planar body portion formed of a substantially thermally conductive material and having a first side and a second side. The second side is opposite the first side. The first side has a coating with a high emissivity. The first side transfers heat to an inside surface of at least the outer edge section of the roof. A heat source is attached to the body portion of the heat conduction device.

An advantage of the present invention is that a user does not need to physically access the heating apparatus in order to reset or test the ground fault circuit interrupter or to monitor the status of the heater.

Another advantage is that a single remote transceiver can be used to communicate with multiple heating devices and their controls.

Yet another advantage is that conductive and infrared heat losses are minimized.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
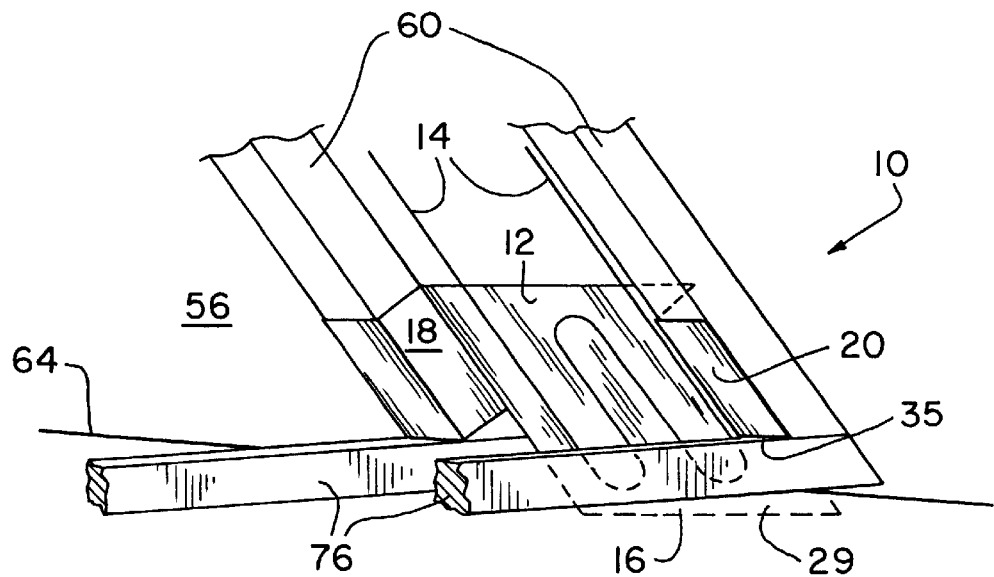
FIG. 1 is a perspective view of one embodiment of the snow melting apparatus of the present invention, mounted adjacent the inside surface of a roof.

Referring now to the drawings, and particularly to FIG. 1, there is shown a snow melting apparatus 10 including a heat conduction device 12 and a heater wire 14.

Heat conduction device 12 is formed monolithically of at least one sheet of thermally conductive material, such as aluminum. Heat conduction device 12 includes a planar body portion 16, two planar side portions 18 and two planar wings 20.

Figure 2:
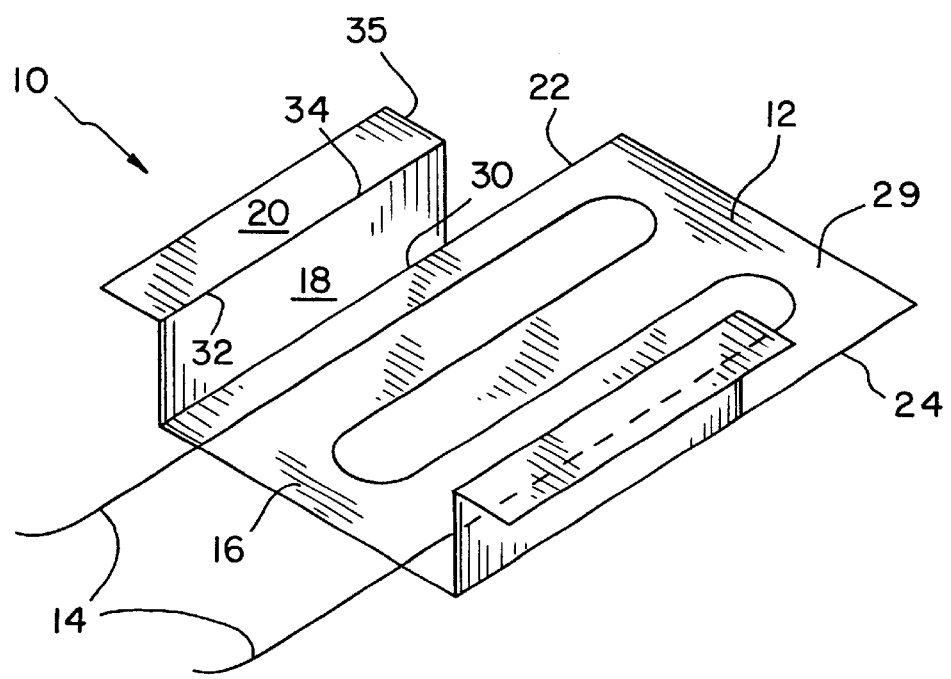
FIG. 2 is a perspective view of the snow melting apparatus of FIG. 1.
Figure 3:
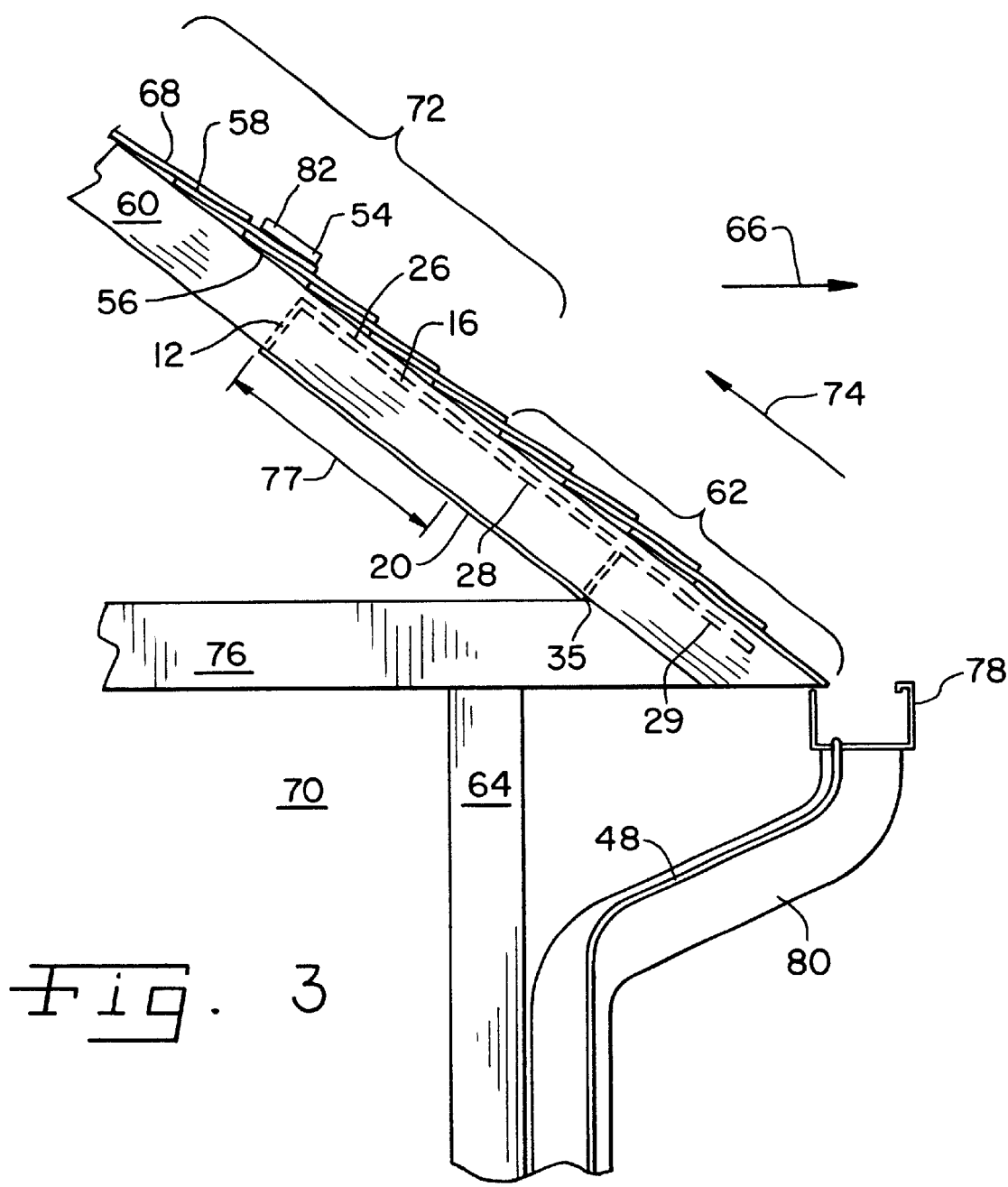
FIG. 3 is a cross-sectional view of another embodiment of the snow melting apparatus connected to a roof and to an associated gutter and downspout.

Body portion 16 has two opposite ends 22 and 24 (FIG. 2), a first side 26 (FIG. 3) and a second side 28. Side portions 18 extend perpendicularly from respective ends 22 and 24 of body portion 16 in a direction opposite or away from first side 26 of body portion 16. Body portion 16 has a distal part 29 which projects out from between side portions 18. Each side portion 18 has two opposite ends 30 and 32, with a first end 30 being attached to a respective one of ends 22 and 24 of body portion 16. Thus, heat conduction device 12 takes the shape of a "C-channel" heater.

Wings 20 extend perpendicularly and in opposite directions from respective ends 32 of respective side portions 18. A proximal end 34 of each wing 20 is attached to a respective end 32 of a respective side portion 18. Each wing 20 has a respective edge 35.

A first controller 36 (FIG. 4) selectively applies electrical current from a power supply 38 to heater wire 14. A receiver 40 connected to controller 36 can be used to receive an airborne signal, such as a radio frequency signal. The airborne signal, which is transmitted by a transmitter 42, indicates that operation of heater wire 14 is required, and that power from supply 38 should be applied thereto by controller 36. Antennas 44 and 46 are for receiving and transmitting, respectively, the airborne signal.

A second heater wire 48 has electrical current from a power supply 50 selectively applied thereto by a second controller 52. A sensor assembly 54 for sensing ambient precipitation and/or temperature is connected to controller 52.

Figure 5:
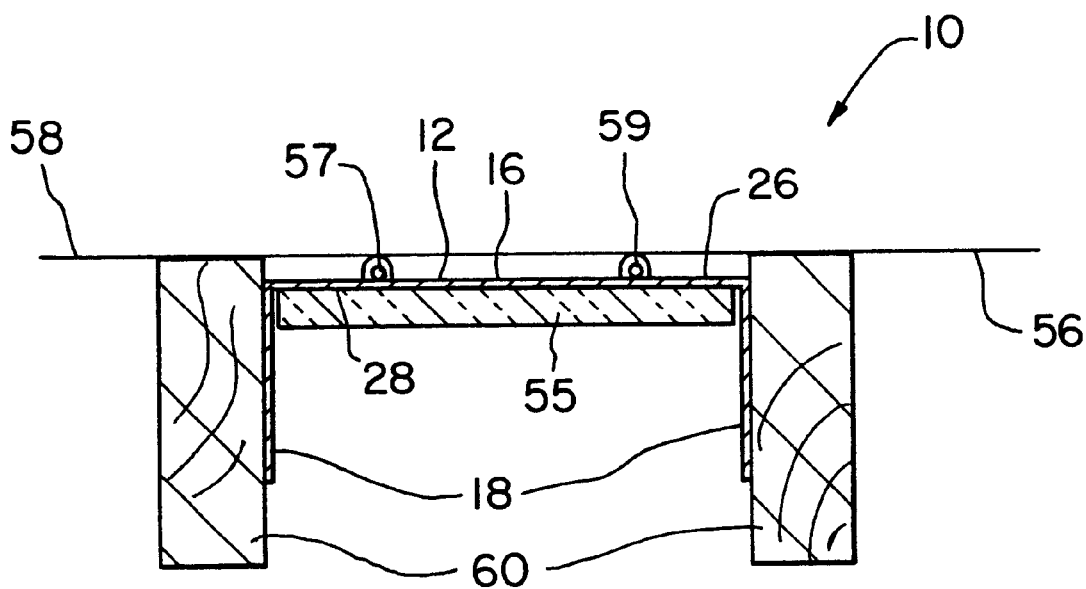
FIG. 5 is a cross-sectional view of another embodiment of the snow melting apparatus connected to a roof.

In another embodiment (FIG. 5), a layer of thermal insulation 55 is attached to second side 28 of body portion 16. In FIG. 5, heater wire 14 is shown as being attached directly to inside surface 56 of roof 58. Heater wire 14 is also attached to first side 26 of body portion 16, rather than to second side 28, as in FIGS. 1 and 2. Heater wire 14 can be seen to include a central conductor 57 surrounded by a layer of electrical insulation 59, such as polyvinylchloride.

During manufacture, heat conduction device 12 can be cut from a sheet of thermally conductive material, such as aluminum. Side portions 18 can be formed by bending the sheet aluminum along ends 22 and 24. Similarly, wings 20 can be formed by again bending the sheet aluminum along ends 32 of side portions 18. Heater wire 14 includes a core electrical conductor surrounded by a layer of electrically insulating material. Heater wire 14 is then attached, such as by stapling or bonding, to first side 26 or second side 28 of body portion 16 in a serpentine pattern.

During installation, the assembly formed of heat conduction device 12 and heater wire 14 is mounted adjacent to an inside surface 56 of a roof 58. If roofing nails have been used to attach the shingles of roof 58, then a gap should be maintained between inside surface 56 and the assembly formed of heat conduction device 12 and heater wire 14 in order to avoid the roofing nails touching heater wire 14. If the shingles are attached in another way, such as by stapling, then the assembly formed of heat conduction device 12 and heater wire 14 can directly engage and be attached to inside surface 56 of roof 58. The width of body portion 16 between ends 22 and 24 is such that heat conduction device 12 fits snugly between two parallel rafters 60 which are attached to inside surface 56 of roof 58. Side portions 18 and/or wings 20 can be attached to respective rafters 60, such as by stapling or nailing.

An outer edge section 62 of roof 58 extends over and beyond an outside wall 64 in an outward, horizontal direction, indicated by arrow 66. Outer edge section 62 is particularly subject to having ice dams form on its outside surface 68 because outer edge section 62 is not exposed to the heat within building 70 which rises up to heat an inner section 72 of roof 58 and melt the snow thereon. Thus, the melted snow tends to refreeze when it reaches outer edge section 62, thereby forming ice dams.

For the above reasons, heat conduction device 12 is placed such that it can heat as much as possible of inside surface 56 of outer edge section 62. After being inserted between rafters 60, heat conduction device 12 is slid along rafters 60 in a downward and outward direction, opposite to a direction of incline 74 of roof 58, until edges 35 of wings 20 engage respective horizontal cross beams 76 of building 70. Heat conduction device 12 is oriented such that distal part 29 of body portion 16 extends over and beyond outside wall 64. In this installed position, a length 77 by which body portion 16 extends in direction 74 from outside wall 64 can be approximately 12 inches.

Figure 4:
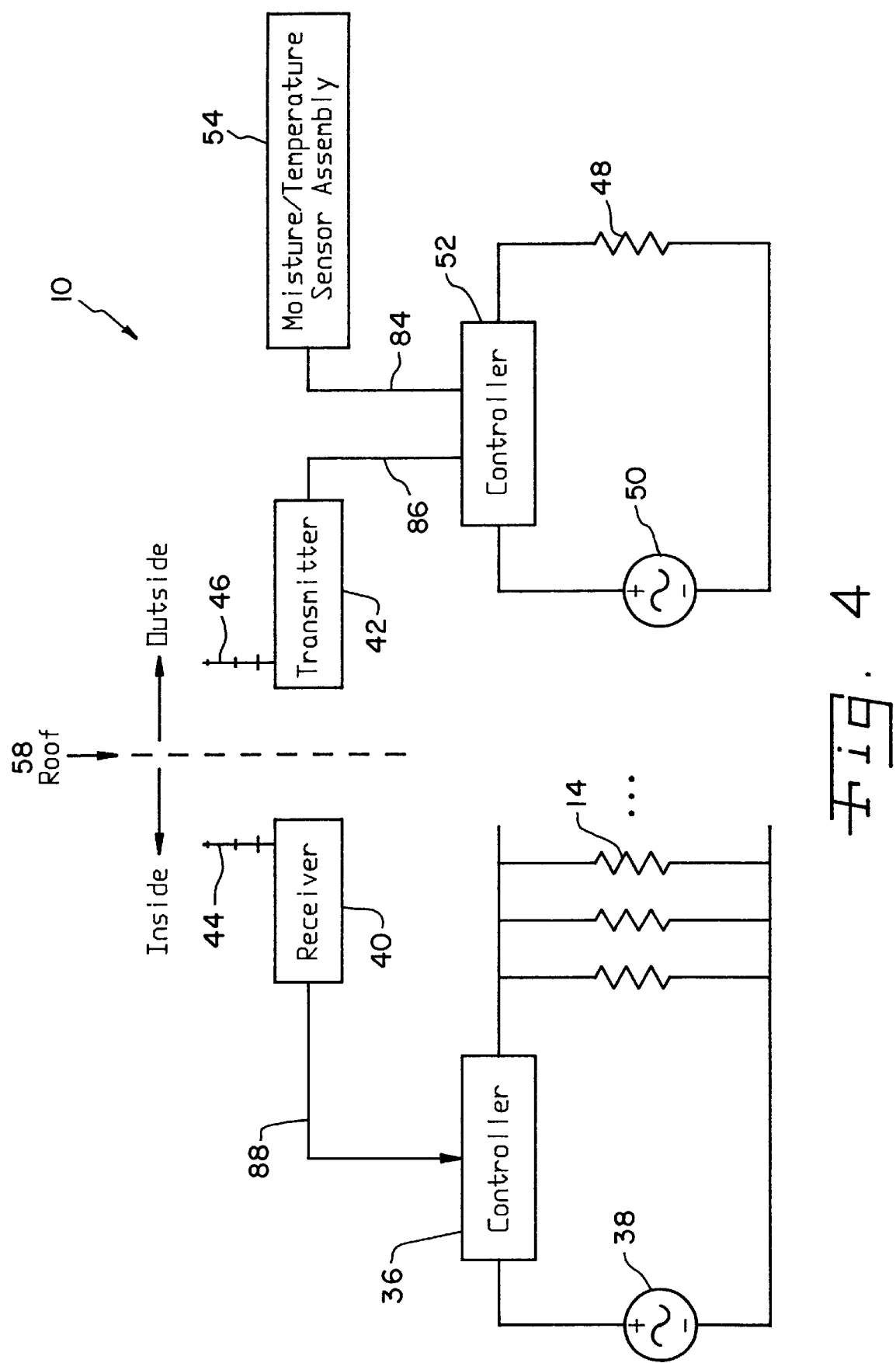
FIG. 4 is a schematic diagram of the snow melting apparatus of FIG. 3.

A separate heat conduction device 12 and associated heater wire 14 can be installed between each pair of parallel and adjacent rafters 60. As indicated in FIG. 4, heater wires 14 can be connected in parallel to power supply 38.

Heat wire 48 is placed in a gutter 78 and/or a downspout 80 attached to gutter 78. Controller 52, sensor assembly 54, transmitter 42 and antenna 46 can be all packaged in a common housing 82 which is installed on outside surface 68 of roof 58.

It is possible for sensor assembly 54 to include a plurality of moisture/temperature sensors installed at different locations on outside surface 68. Each of the sensors can be connected to a common controller 52 in an "or" configuration. That is, it is only necessary for one of the sensors to sense an ambient temperature below a predetermined level and/or the presence of ambient precipitation in order for controller 52 to call for heat from heaters 14 and 48.

During use, when sensor assembly 54 senses an ambient temperature below a predetermined level, such as 38° F., and/or the presence of ambient precipitation, a signal is transmitted to controller 52 on line(s) 84. Upon receiving this signal, controller 52 connects power supply 50 to heater wire 48, thereby causing heater wire 48 to dissipate heat. The heat is then conductively transferred to gutter 78 and/or downspout 80, ensuring a drainage path for any water within gutter 78. Controller 52 also transmits a signal on line 86 which, in turn, causes transmitter 42 to transmit an airborne signal from antenna 46. The airborne signal has a frequency of approximately between 200 MHz and 400 MHz. In order to avoid interfering with other devices which operate in this frequency range, such as garage door openers, the airborne signal can be transmitted for only a short interval of time, such as for less than 15 seconds within any one hour time interval. Heater wires 14 and 48 can continue to operate for up to approximately 1.5 hours after the termination of the air-borne signal.

When antenna 44 of receiver 40 receives the airborne signal, a signal is transmitted from receiver 40 to controller 36 on line 88, indicating that the airborne signal has been received. As indicated in FIG. 4, the airborne signal is transmitted from the outside of building 70 through roof 58 and to the inside of building 70, i.e., to antenna 44, receiver 40 and controller 36. Upon receiving the signal on line 88, controller 36 interconnects power supply 38 with one or more of heaters 14. The operation of heaters 14 can be dependent upon the operation of heaters 48. For instance, heaters 14 can be operated for a longer period of time than are heaters 48.

The heat from heaters 14 is dispersed by heat conduction device 12 throughout the entire body portion 16. The heat within body portion 16 is then transferred by conduction to inside surface 56. The heat then conducts to roof 58 and to its outside surface 68. As outside surface 68 heats up, it melts any ice or snow which falls or has accumulated thereon. The melted snow and ice then drains into gutter 78 and flows down downspout 80. Controllers 36 and 52 can shut off heaters 14 and 48, respectively, after respective periods of time after the start of operation. For example, controller 36 can stop operation of heaters 14 after approximately 1 hour.

Heater wire 14 has been shown as being attached to either first side 26 or second side 28 of body portion 16. However, it is to be understood that heater wire 14 can also be embedded within body portion 16.

Side portions 18 and wings 20 have been shown as being formed of a thermally conductive material. However, it is to be understood that sides 18 and wings 20 can also be formed of a non-thermally conductive material in order to avoid conducting heat away from inside surface 56 of roof 58. Alternatively, it is possible to place a layer of thermally insulative material between rafters 60 and side portions 18 and/or wings 20.

Wings 20 have been shown as being attached to an inside surface of a rafter 60, i.e., to a surface facing the inside of building 70. However, it is to be understood that it is possible for heat conduction device 12 be a planar, unbent sheet, with wings attached to respective outside surfaces of rafters 60, i.e., to surfaces facing and possibly in contact with roof 58.

Controller 52 has been described as being located on outside surface 68 of roof 58. However, it is also possible for the heating apparatus to be controlled by a single controller located within building 70. The single controller could be hard wired to a moisture and/or temperature sensor located outside building 70.

Figure 6:
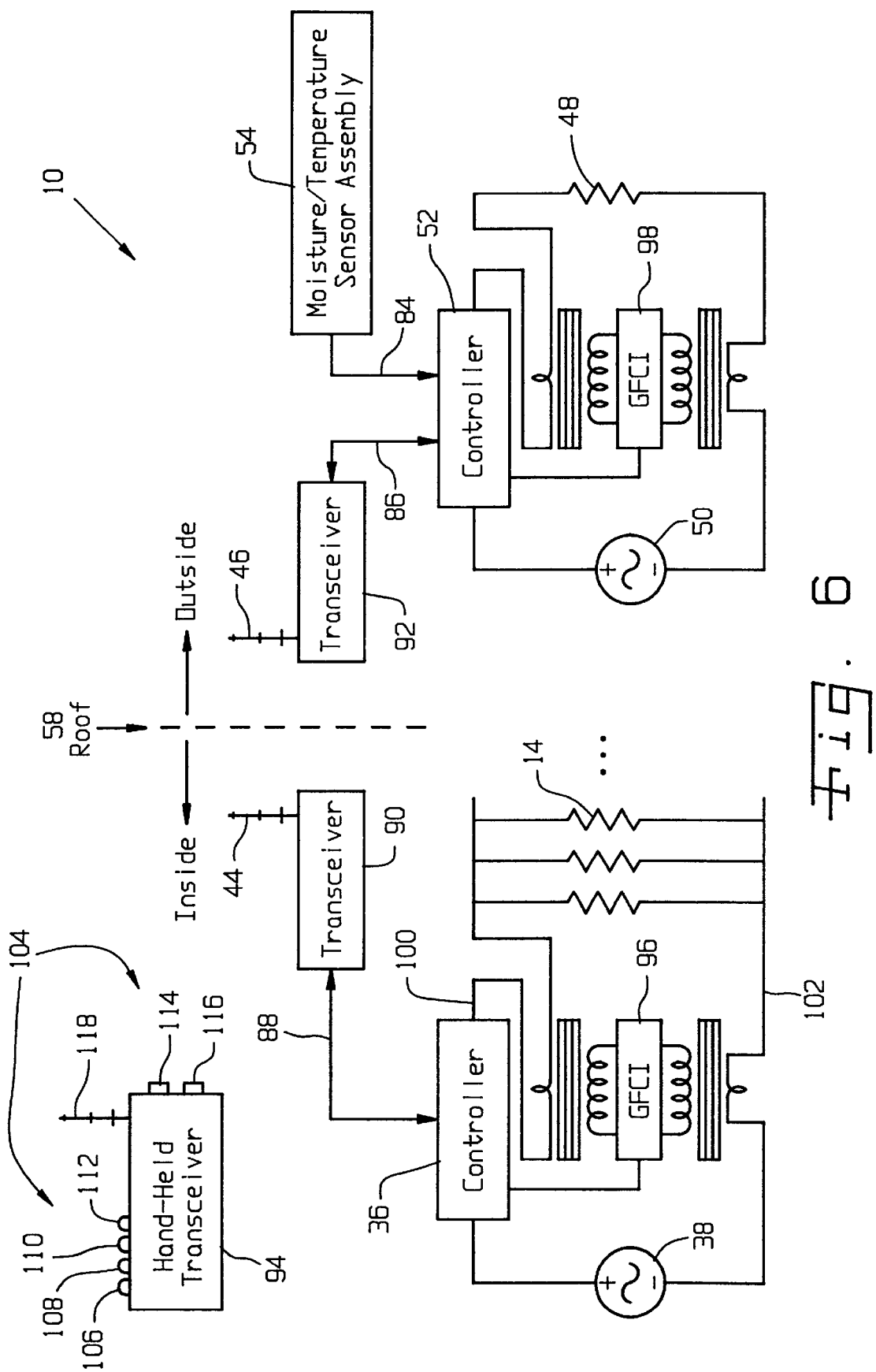
FIG. 6 is a schematic diagram of another embodiment of the snow melting apparatus of FIG. 3.

In yet another embodiment (FIG. 6), transceivers 90 and 92 respectively perform all of the functions of receiver 40 and transmitter 42 described above, and also perform additional functions which are described in detail below. More particularly, a hand-held transceiver 94 allows a user to send and receive information from each of heater transceivers 90 and 92.

A ground fault circuit interrupter (GFCI) 96 is coupled across heater wire 14 and is connected to controller 36. Another GFCI 98 is coupled across heater wire 48 and is connected to controller 52. GFCI 96 detects ground fault conditions by comparing a line current in conductor 100 to a neutral current in conductor 102. If the difference between the two currents exceeds 30 milliamperes, GFCI 96 instructs controller 36 to prevent current from flowing through conductor 100. Controller 36 then sends a signal on line 88 instructing transceiver 90 to transmit a radio frequency ground fault signal indicating the presence of a ground fault condition. Once GFCI 96 has been tripped, GFCI 96 must be reset in order to cancel GFCI operation and allow power to be reapplied to heaters 14.

Hand-held transceiver 94 has a user interface 104 including lamps 106, 108, 110, 112 and pushbuttons 114 and 116. Hand-held transceiver 94 receives the signal generated by transceiver 90, indicating that a ground fault has occurred, and illuminates lamp 106 in order to provide a visible indication to the user that attention is required. Upon seeing that lamp 106 has been illuminated, the user may then actuate reset button 114. Transceiver 94 transmits a radio frequency reset command signal via antenna 118 in response to actuation of reset button 114. Transceiver 90 receives the reset command signal and relays it to controller 36, which then resets GFCI 96.

A user may initiate a test of GFCI 96 by actuating test button 116. Transceiver 94 transmits a radio frequency test command signal via antenna 118 in response to actuation of test button 116. Transceiver 90 receives the test command signal and relays it to controller 36, which then tests GFCI 96. Controller 36 can perform the test by closing a switch (not shown) which provides an alternate current path in parallel to conductor 102. This alternate current path reduces the current through conductor 102 and thereby simulates a ground fault condition. Upon sensing the reduced current in conductor 102, GFCI 96 trips and prevents further current flow in conductor 100. After seeing that lamp 106 has been illuminated, indicating that GFCI 96 has operated properly, the user can actuate reset button 114 in order to reset GFCI 96 as described above.

Controller 36 also generates a heater status signal through transceiver 90 indicating that current is being carried by conductor 100 and that heater 14 is operating. Hand-held transceiver 94 receives this operational status signal and illuminates lamp 108 in response thereto. The illumination of lamp 108 is an indication to the user that heater 14 is operating.

Transceiver 90 must continuously receive either the reset command signal or the test command signal for a predetermined period of time, such as between 2 seconds and 7 seconds, before controller 36 responds thereto. This delay prevents extraneous, transient radio frequency signals received by transceiver 90, such as from automatic garage door openers, for example, from being incorrectly interpreted as command signals from transceiver 94. Preferably, the predetermined period of time can be approximately 5 seconds.

The operation of transceiver 92, controller 52 and GFCI 98 are substantially similar to the operation of transceiver 90, controller 36 and GFCI 96, respectively, as described above with relation to FIG. 6. Thus, the operation of transceiver 92, controller 52 and GFCI 98 will not be described in detail herein. The operation of lamps 110 and 112 in response to transceiver 92 is also substantially similar to the operation of lamps 106 and 108 in response to transceiver 90, and will not be described in detail herein.

In order to discriminate between which of transceiver 90 and transceiver 92 is to receive a command signal transmitted by transceiver 94, the command signal is transmitted with a power level sufficient to be received by only a closer one of transceivers 90 and 92. Transceivers 90 and 92 are physically displaced from one another by a distance that is large enough to facilitate such discrimination. The user physically carries hand-held transceiver 94 to an area in proximity to the selected one of transceivers 90 and 92 that is to be addressed. The user then manipulates user interface 104 as described above in order to transmit a command signal. The command signal is then received by the one of transceivers 90, 92 that is closer to transceiver 94. However, the command signal is not received by the one of transceivers 90, 92 that is further from transceiver 94. Similarly, the ground fault signals and heater status signals may be transmitted by transceivers 90 and 92 with a low level of power such that they can be received by only a relatively nearby hand-held receiver 94.

Alternatively, each of the ground fault signal and heater status signal can include address information to identify from which of transceivers 90 and 92 that the signals originate. Similarly, the command signals transmitted by transmitter 94 can include address information to identify which of transceivers 90 and 92 is to receive and respond to the command signals.

The frequencies of the ground fault signal, heater status signal, and command signals are in the range of 300 MHz to 900 MHz. However, it is also possible for these signals to be infrared signals or to be carried on wire conductors. Further, the signals may be transmitted between transceivers 90, 92 and 94 via carrier current on the alternating current power lines.

Hand-held transceiver 94 has been described herein as having visual indicators in the form of lamps 106, 108, 110 and 112. However, it is also possible for transceiver 94 to have audible indicators, such as beepers, to perform the functions of lamps 106, 108, 110 and 112.

The present invention has been described as having only one controller 36 disposed under roof 58. However, it is also possible to include multiple controllers 36 under roof 58, with each controller 36 having a respective transceiver 90, GFCI 96 and heater 14. In this case, hand-held transceiver 94 would communicate with each transceiver 90 separately. Further, the methods by which transceiver 94 would identify which of transceivers 90 was sending or receiving information would be substantially similar to the methods described above with regard to transceiver 94 discriminating between transceiver 90 and transceiver 92.

When installed between rafters 60, the heated panel 16 creates a chimney-effect. This increases the velocity of the air flow on both sides of the heated panel 16 resulting in substantially increased convective heat losses. Also, the lack of insulation thickness may result in infrared heat loss from the heater-side of the panels. Losses can be further increased by the fact that the side of the insulating material exposed to the air may be a relativity good infrared emitter.

Figure 7:
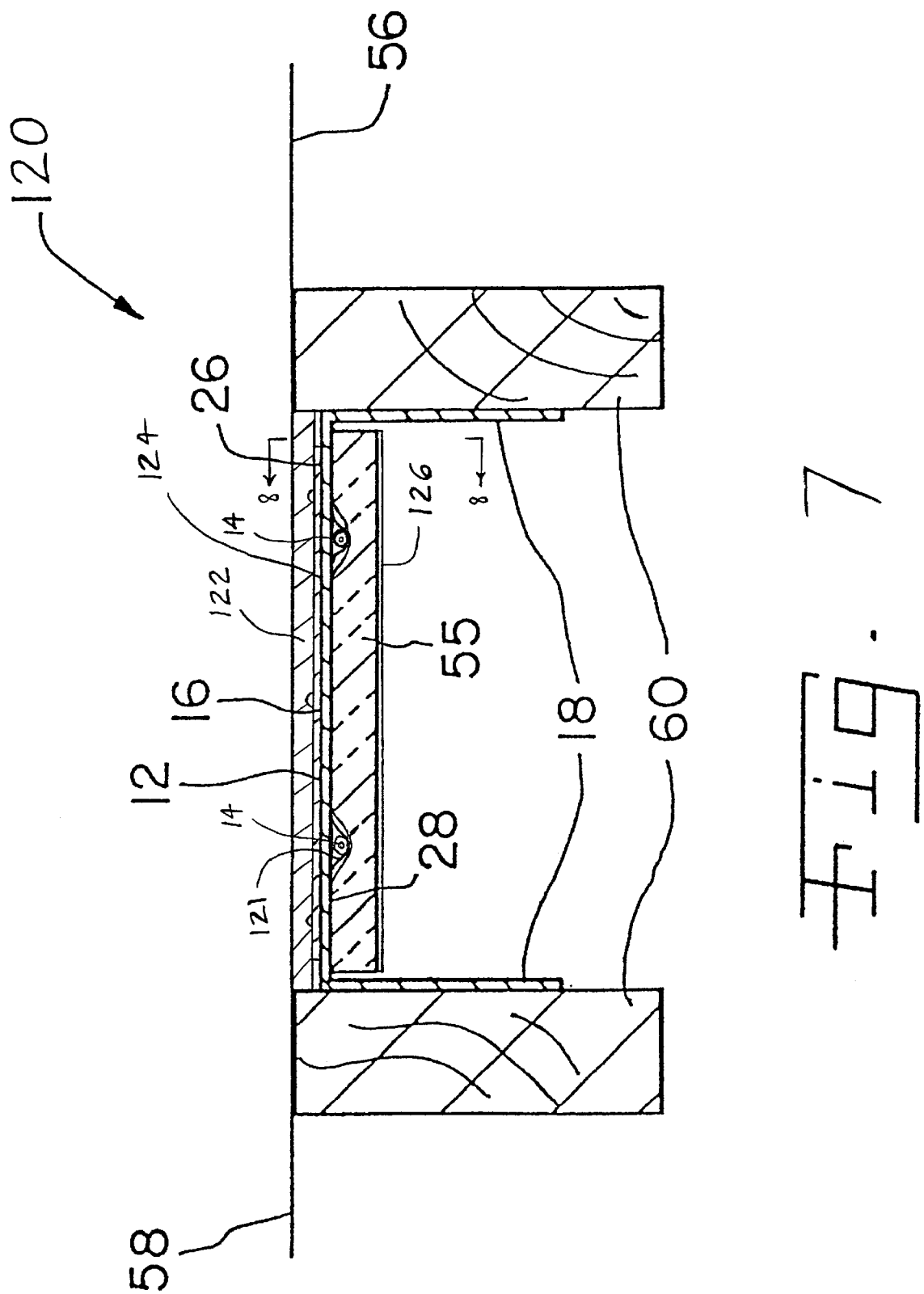
FIG. 7 is a cross-sectional view of yet another embodiment of the snow melting apparatus of the present invention connected to a roof.

In yet another embodiment (FIG. 7), a snow melting apparatus 120 reduces both convective heat losses and infrared heat losses from the heaters. Snow melting apparatus 120 includes a heat conduction device 12, a heater wire 14, layer of thermal insulation 55, and an L-shaped vinyl gasket 122. Heater wire 14 is attached to body panel 16 with tape 121. Snow melting apparatus 120 is more thermally efficient and has improved heat transfer relative to the other embodiments disclosed above. Thermal efficiency, as defined herein, is the temperature rise of the shingle surface per watt of heater power. Snow melting apparatus 120 improves the thermal efficiency by a factor of almost three. Advantages of snow melting apparatus 120 include the use of long wavelength infrared radiation for heating the roof, reduced convective heat losses, and reduced infrared losses from the heater assembly.

As received from the mill (i.e., manufacturer), both sides of body panel 16 have a high metallic luster. This results in an exceptionally low infrared emissivity. Hence, body panel 16 alone is an inefficient infrared radiator. Increasing radiation efficiency requires increasing infrared emissivity on first side 26 of body panel 16 and decreasing infrared emissivity on second side 28. The use of long wavelength infrared radiation improves thermal efficiency. A layer of flat black paint 124 on first side 26 of body panel 16 dramatically improves system performance by increasing the infrared emissivity of first side 26 from less than 0.2 to more than 0.8. The long wavelength radiation efficiency is maximized in the direction of the roof, thereby reducing losses due to spurious infrared radiation. Ideally, all of the energy applied to body panel 16 is converted into long wavelength infrared energy and transmitted in the direction of the roof.

A bright metallic coating layer 126 is attached to or sputtered on a side of insulation 55 that is opposite heaters 14. Reflective coating layer 126 substantially reduces infrared radiation and emissivity, thus further improving thermal efficiency.

Insulation 55 with reflective coating 126 can be attached to body panel 16 using a spray adhesive. This provides excellent infrared and conductive insulation. Both sources of heat loss are reduced to negligible levels. This substantially eliminates convection currents flowing up the open channel formed by rafters 60 and heater assembly 12.

In effect, roof 58, heater assembly 12 and rafters 60 form a hollow rectangular box that acts as a chimney. Operating the heaters in heater assembly 12 causes efficiency-robbing convection currents to rise to the apex of roof 58. This causes forced convection resulting in increased energy transfer into the air. These convection currents dramatically increase thermal losses. Snow melting apparatus 120 reduces and restricts air flow through the chimney in order to minimize the energy losses due to forced convection.

Layer of thermal insulation 55 and gasket 122 both reduce heat losses due to uncontrolled convection. Gasket 122 is disposed in a convection current outlet defined between rafters 60, inside surface 56 of roof 58, and an upper end of first side 26 of heated panel 16. Thereby, gasket 122 blocks or obstructs air flow through the convection current outlet. Further, insulation 55, which may have a thickness of approximately 3/16 inch, increases the thermal resistance between the heaters, thus reducing the energy available for convective heat transfer.

Figure 8:
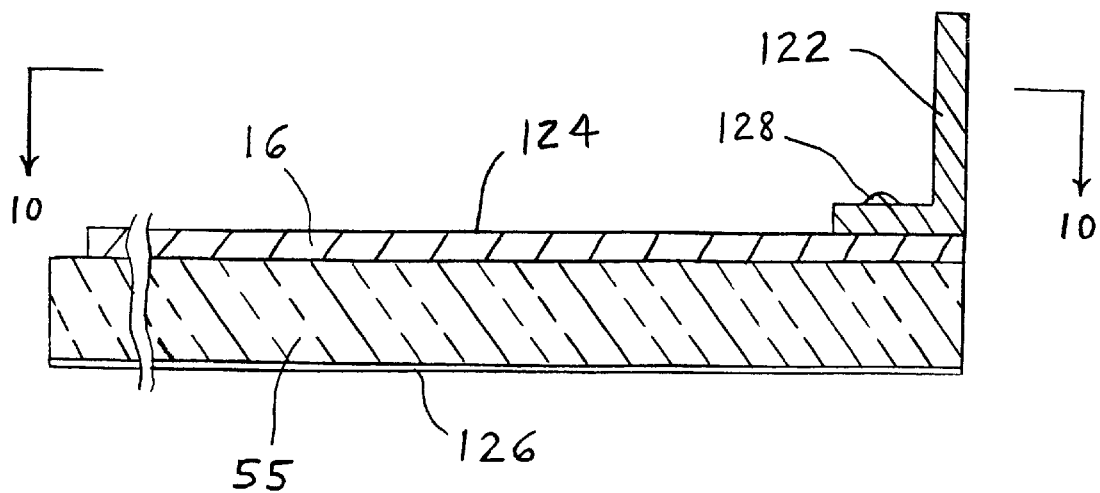
FIG. 8 is a fragmentary, side, cross-sectional view of the gasket, body panel and insulation along line 8—8 of FIG. 7.

As best seen in FIG. 8, the flexible, L-shaped vinyl gasket 122 is attached to the end of body panel 16. In effect, gasket 122 seals the end of the chimney in the direction of the apex of roof 58. The supple, flexible nature of gasket 122 allows it to bend around any nails protruding through roof 58.

Figure 9:
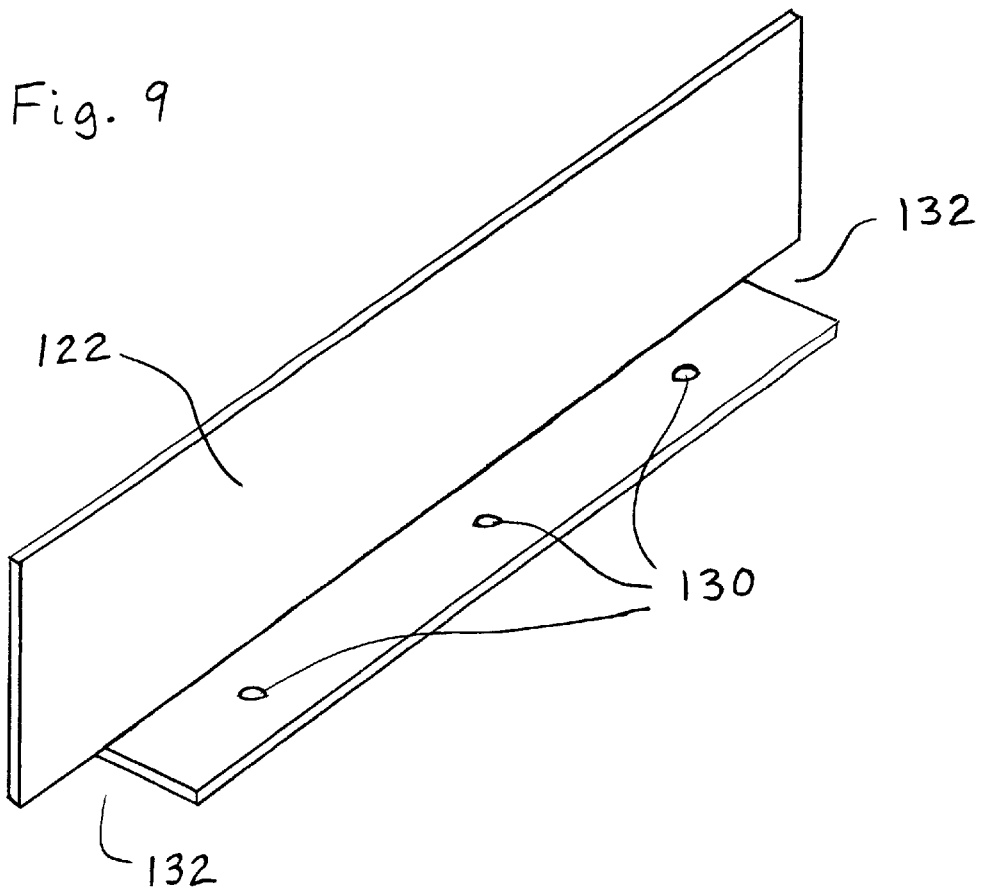
FIG. 9 is a perspective view of the gasket of FIG. 7.

Gasket 122 is attached to heater assembly 12 using 'pop' rivets 128. Gasket 122 includes throughholes 130 (FIG. 9) for mounting pop rivets 128. Notches 132 serve to clear the mounting brackets for heater assembly 12 during installation.

Figure 10:
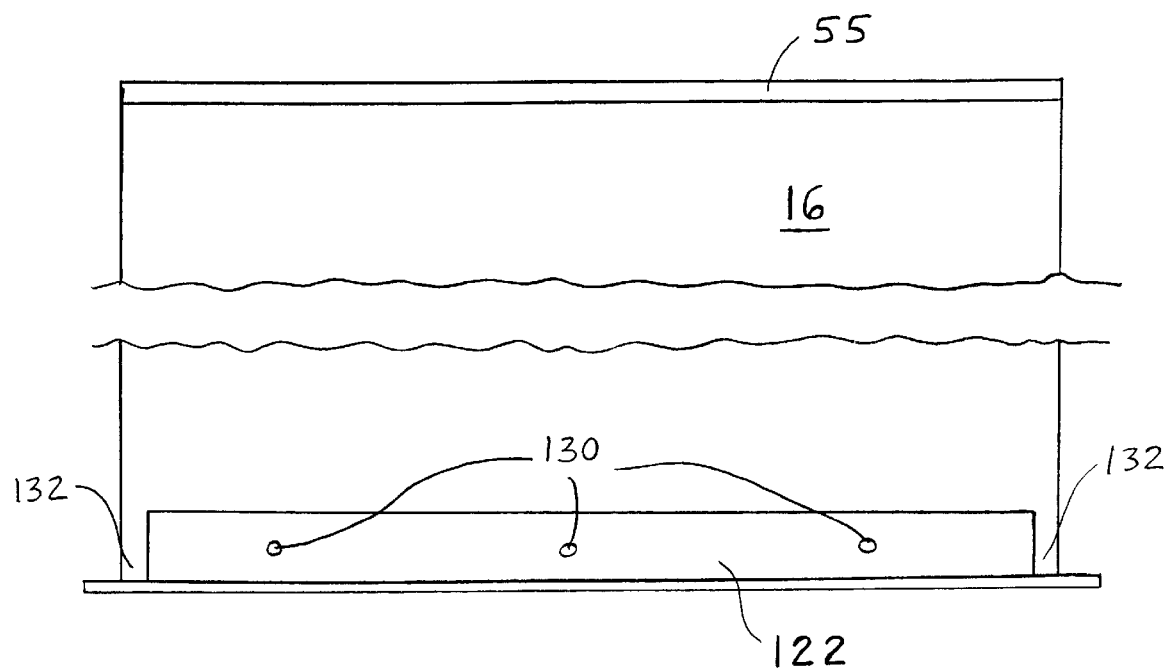
FIG. 10 is a fragmentary, top view along line 10—10 of FIG. 8.

As shown in FIGS. 8 and 10, insulation 55 with reflective coating 126 extends past the end of body portion 16 opposite from gasket 122. When installed, heater assembly 12 contacts the soffit. The extension or overlap of insulation 55 helps seal this end of the chimney adjacent to the soffit.

Snow melting apparatus 120 improves thermal efficiency by enhancing long wavelength infrared radiation in the direction of the roof and attenuating it elsewhere. The high emissivity coating of black paint and the reflective coating 126 on insulation 55 accomplish this improvement in thermal efficiency. Gasket 122, insulation 55, and the control of air flow through a spurious chimney reduce convective heat losses.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A snow-melting apparatus for preventing ice dams on an outside surface of a roof of a building, an outer edge section of the roof extending over and beyond an outside wall of the building in an outward direction, the roof having a plurality of elongate rafters attached to an inside surface of the roof, at least two of said rafters extending substantially parallel to each other, said apparatus comprising:

a heat conduction device including a substantially planar body portion formed of a substantially thermally conductive material and having a first side and a second side, said second side being opposite said first side, said first side having a coating with a high emissivity, said first side being configured for transferring heat to an inside surface of at least the outer edge section of the roof, said heat conduction device also including a pair of side portions connectively disposed along edges of said planar body portion substantially perpendicular to said planar body portion, said pair of side portion being configured for at least one of simultaneously engaging and being simultaneously connected to a pair of corresponding adjacent rafters; and a heat source attached to said body portion of said heat conduction device.

2. The apparatus of claim 1, wherein said high emissivity coating is of a dark color.

3. The apparatus of claim 1, wherein said high emissivity coating comprises a dark paint.

4. The apparatus of claim 1, wherein said high emissivity coating comprises black paint.

5. The apparatus of claim 1, wherein the roof has an inner section disposed on an opposite side of the outside wall from the outer edge section, said first side of said body portion of said heat conduction device being configured for contacting and transferring heat to an inside surface of the inner section of the roof.

6. The apparatus of claim 5, wherein said first side of said body portion of said heat conduction device is configured for extending approximately 12 inches inward from the outside wall along the inner section of the roof.

7. The apparatus of claim 1, wherein said high emissivity coating has an emissivity of at least 0.8.

8. A snow-melting apparatus for preventing ice dams on an outside surface of a roof of a building, an outer edge section of the roof extending over and beyond an outside wall of the building in an outward direction, said apparatus comprising:

a heat conduction device including a substantially planar body portion formed of a substantially thermally conductive material and having a first side and a second side, said second side being opposite said first side, said first side being configured for transferring heat to an inside surface of at least the outer edge section of the roof;

a layer of thermal insulation attached to said second side of said body portion of said heat conduction device, said layer of thermal insulation having a sealing extension and a reflective coating; and a heat source attached to said body portion of said heat conduction device.

9. The apparatus of claim 8, wherein said layer of thermal insulation has:

a first side attached to said second side of said body portion of said heat conduction device; and a second side having said reflective coating, said second side being disposed opposite said first side.

10. The apparatus of claim 8, further comprising a layer of adhesive interconnecting said layer of thermal insulation and said second side of said body portion of said heat conduction device.

11. A snow-melting apparatus for preventing ice dams on an outside surface of a roof of a building, an outer edge section of the roof extending over and beyond an outside wall of the building in an outward direction, said apparatus comprising:

a heat conduction device including a substantially planar body portion formed of a substantially thermally conductive material and having a lower end, a first side and a second side, said second side being opposite said first side, said first side being configured for transferring heat to an inside surface of at least the outer edge section of the roof;

a layer of thermal insulation attached to said second side of said body portion of said heat conduction device, said layer of thermal insulation extending beyond said lower end of said body portion of said heat conduction device, said layer of thermal insulation having a reflective coating; and a heat source attached to said body portion of said heat conduction device.

12. A snow-melting apparatus for preventing ice dams on an outside surface of a roof, said apparatus comprising:

a heat conduction device formed of a substantially thermally conductive material and having a substantially planar outer surface configured for being disposed adjacent to an inside surface of the roof, an upper end of said substantially planar outer surface of said heat conduction device being configured for defining a convection current outlet with the inside surface of the roof;

a convection current blocking device configured for:
    being disposed between said substantially planar outer surface of said heat conduction device and the inside surface of the roof; and
    at least partially obstructing said convection current outlet; and a heat source attached to said heat conduction device.

13. A snow-melting apparatus for preventing ice dams on an outside surface of a roof, said apparatus comprising:

a heat conduction device formed of a substantially thermally conductive material, said heat conduction device being configured for being disposed adjacent to an inside surface of the roof, an upper end of said heat conduction device being configured for defining a convection current outlet with the inside surface of the roof;

a gasket configured for at least partially obstructing said convection current outlet; and a heat source attached to said heat conduction device.

14. The apparatus of claim 13, wherein said gasket is attached to said upper end of said heat conduction device.

15. The apparatus of claim 13, wherein said gasket is riveted to said upper end of said heat conduction device.

16. A snow-melting apparatus for preventing ice dams on an outside surface of a roof, said apparatus comprising:

a heat conduction device formed of a substantially thermally conductive material, said heat conduction device being configured for being disposed adjacent to an inside surface of the roof, an upper end of said heat conduction device being configured for defining a convection current outlet with the inside surface of the roof, said convection current outlet being at least partially defined by at least one rafter;

a convection current blocking device configured for at least partially obstructing said convection current outlet, said convection current blocking device being disposed closely adjacent to said at least one rafter; and a heat source attached to said heat conduction device.

17. The apparatus of claim 16, wherein said at least one rafter comprises two rafters, said heat conduction device including:

a substantially planar body portion having a first side and a second side, said second side being opposite said first side, said first side being configured for transferring heat to the inside surface of the roof, said body portion having two opposite ends; and two substantially planar side portions extending orthogonally from said body portion in a direction substantially opposite said first side of said body portion, each said side portion having two opposite ends, a first of said ends being attached to a respective said opposite end of said body portion, each said side portion being configured for at least one of engaging and being connected to a respective one of said two rafters.

18. The apparatus of claim 17, wherein each said side portion is configured for being directly attached to said respective rafter.

19. The apparatus of claim 17, wherein said heat conduction device is monolithic, said thermally conductive material comprising aluminum.

20. The apparatus of claim 12, wherein said heat source comprises an electrically insulated heating wire.

21. The apparatus of claim 12, wherein said convection current blocking device is flexible.

* * * * *